United States Patent
Kanatani et al.

(10) Patent No.: US 6,839,501 B2
(45) Date of Patent: Jan. 4, 2005

(54) VIDEO CASSETTE RECORDER

(75) Inventors: Tatsuya Kanatani, Osaka (JP); Hidehito Uemura, Osaka (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 936 days.

(21) Appl. No.: 09/750,731

(22) Filed: Dec. 28, 2000

(65) Prior Publication Data

US 2001/0024563 A1 Sep. 27, 2001

(30) Foreign Application Priority Data

Dec. 28, 1999 (JP) .......................... 11-373892

(51) Int. Cl.[7] .......................... H04N 5/91; H04N 5/95; G11B 15/12
(52) U.S. Cl. .......................... 386/68; 386/68; 386/83; 386/95; 386/86; 360/61
(58) Field of Search .......................... 386/67, 68, 69, 386/72, 74, 86, 87, 89, 81, 6–8; 360/61, 10.1–10.3

(56) References Cited

U.S. PATENT DOCUMENTS 5,541,780 A * 7/1996 Han .......................... 386/69
5,825,971 A * 10/1998 Inoue et al. .......................... 386/122

FOREIGN PATENT DOCUMENTS

| JP | 11073602 | 3/1999 |
| JP | 11224415 | 8/1999 |

* cited by examiner

Primary Examiner—Thai Tran
Assistant Examiner—Jam Vent
(74) Attorney, Agent, or Firm—RatnerPrestia

(57) ABSTRACT

There is provided a video cassette recorder comprising a delay element (1), a switching unit (2) for switching an output of the delay element (1), a logic unit (3) for controlling the switching unit (2), and a skew detection unit (4) for detecting a skew, wherein the delay element (1) shares a delay element used for vertical emphasis/vertical de-emphasis and for a comb line filter during a special replay. The video cassette recorder thus provides a fast-forwarding replay image, a rewinding replay image and a still image with improved skew distortion from a tape recorded in a long recording mode providing quintuple the recording time of a standard mode. This realizes an excellent special replay image at low cost without requiring an expensive circuit such as a TBC and the like.

7 Claims, 7 Drawing Sheets

VIDEO CASSETTE RECORDER

FIELD OF THE INVENTION

The present invention relates to a video cassette recorder having a recording/replay mode that affords quintuple the recording time of the standard recording/replay mode.

BACKGROUND OF THE INVENTION

With the increasing prevalence of video cassette recorders (hereinafter referred to as "VCR") for household use, price-cutting has been advanced in recent years for VCR's of the VHS format. There are also increased chances of recording television programs, as the programs are finding their way into diversification and multiplication. In response to the demand of users for reduction of running cost of recording tapes and increase in length of the recording time, there has been introduced into the market in the year 1999, new products provided with a function of quintuplex recording/replay mode, in addition to the conventionally available standard recording/replay mode and the triplex recording/replay mode.

A VCR of the VHS format of the prior art will be described hereinafter. FIG. 7 is a schematic illustration of a tape pattern depicting recorded tracks and positions of horizontal synchronizing signal recorded on the tracks on a magnetic tape, when recording is made in the quintuplex mode with the VCR for television signal of the NTSC format. As is well known, the VCR of VHS format adopts the azimuth recording method using magnetic heads of different azimuth angles with respect to each other for odd-numbered fields and even-numbered fields. This makes it possible to use a tape pattern not provided with a guard band between the tracks. A number of scanning lines for the NTSC format television signal is 262.5 within one field, and 525 lines in one frame. For the sake of description, they are simplified and shown here as 8.5 lines per one field and 17 lines per one frame. In the figure, a track corresponding to an odd-numbered field of a first frame is represented as 1ODD, a track corresponding to an even-numbered field of the first frame as 1EVEN, a track corresponding to another odd-numbered field of a second frame as 2ODD, and so on in this sequential order from the left to the right. Since this is the well known helical scanning recording method, there occurs a track displacement among adjoining tracks as shown with a reference symbol "αH" in the figure. Individual specifications such as mechanical parameters, a tape feeding speed, and the like are determined so that the track displacement in the standard recording mode (hereinafter referred to as "standard mode") of the VHS format becomes 1.5H. The αH becomes 0.5H in the triplex recording mode (hereinafter referred to as "triplex mode"), and 0.3H in the quintuplex recording mode (hereinafter referred to as "quintuplex mode"). Here, 1H represents a period of the horizontal synchronizing signal, and it is shown by a length corresponding to the period on the tape pattern. Recorded positions of the horizontal synchronizing signal are aligned in a widthwise direction of the track between mutually adjoining fields (so-called "H-alignment"), when the αH is a multiple of 0.5H.

In the quintuplex mode, in which the αH equals 0.3H, there occurs a displacement of 0.2H in H-alignment between the adjoining recorded tracks. Since the H position does not align with the next recorded track in the quintuplex mode, as described, a skew distortion occurs on a television screen during a special replay, in which video reproduction is performed with fast-forwarding or fast-rewinding. The skew distortion occurs because an AFC circuit for horizontal scan in the television set is not able to respond to a change in period of the horizontal synchronizing signal, if continuity of the periodic horizontal synchronizing signals is lost. During the special replay, a magnetic head scans across a plurality of the tracks to reproduce signals. Therefore, the reproduced horizontal synchronizing signals lose their continuity in periodicity, if there is a displacement in the H-alignment.

Heretofore, the VCR's capable of performing special replay of signal recorded in the quintuplex mode use a TBC ("Time Base Corrector"). They realize images free from skew distortion in the special replay (fast-forwarding replay, rewinding replay, and still image) by making time base correction with the TBC.

However, the conventional structure has a problem imposing a large burden of cost, since the TBC requires a frame memory, and so on.

SUMMARY OF THE INVENTION

The present invention is devised in consideration of the above problem of the prior art, and it aims at providing a video cassette recorder capable of reproducing a fast-forwarding replay image, a rewinding replay image, and a still image that are free from skew distortion.

In order to achieve the above object, this invention pertains to a video cassette recorder having a replay function in a long recording mode with quintuple the recording time of the standard mode, and that the video cassette recorder comprises: a delay unit for delaying a reproduced signal by 0.2H, 0.4H, 0.6H, 0.8H, and 1H, or by 0.4H, 0.8H, 1.2H, 1.6H and 2H; a skew detection unit; and a switching unit for switching an output of the delay unit in response to an output signal of the skew detection unit or a head switching signal.

This structure enables the video cassette recorder to perform an excellent special replay, without causing a skew distortion in a signal reproduced in the special replay during a fast-forwarding replay and a rewinding replay of a video-tape recorded in the quintuple long recording mode.

DETAILED DESCRIPTION OF THE INVENTION

Referring now to accompanying figures, exemplary embodiments for a video cassette recorder of the present invention will be described hereinafter.

(First Exemplary Embodiment)

Figure 1:
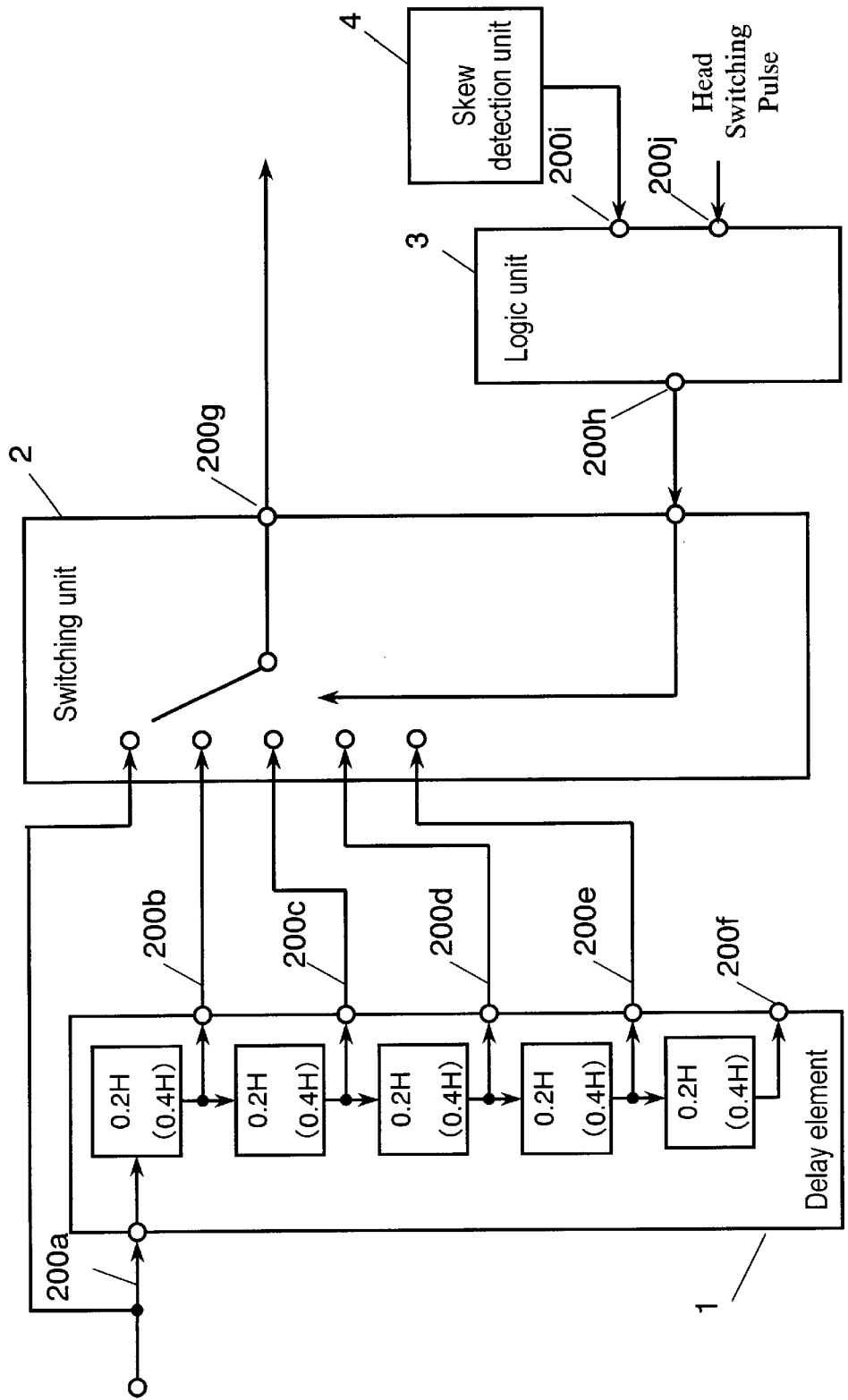
FIG. 1 is a block diagram depicting a structure of an essential portion of a video cassette recorder of a first exemplary embodiment of the present invention.

FIG. 1 is a block diagram, which depicts an essential structure of a video cassette recorder (hereinafter referred to as "VCR") of a first exemplary embodiment of this invention. As shown in FIG. 1, it comprises: a delay element 1 for delaying a signal; a switching unit 2 for selecting a reproduced signal and the signal delayed by the delay element 1; a skew detection unit 4 including, besides others, a skew detector circuit for detecting a portion being out of H-alignment; and a logic unit 3 for controlling the switching unit 2 with an output of the skew detection unit 4 and a head switching pulse, i.e. a head switching signal.

Operation of the VCR will be described hereinafter with reference to FIG. 2 and FIG. 3.

Figure 2:
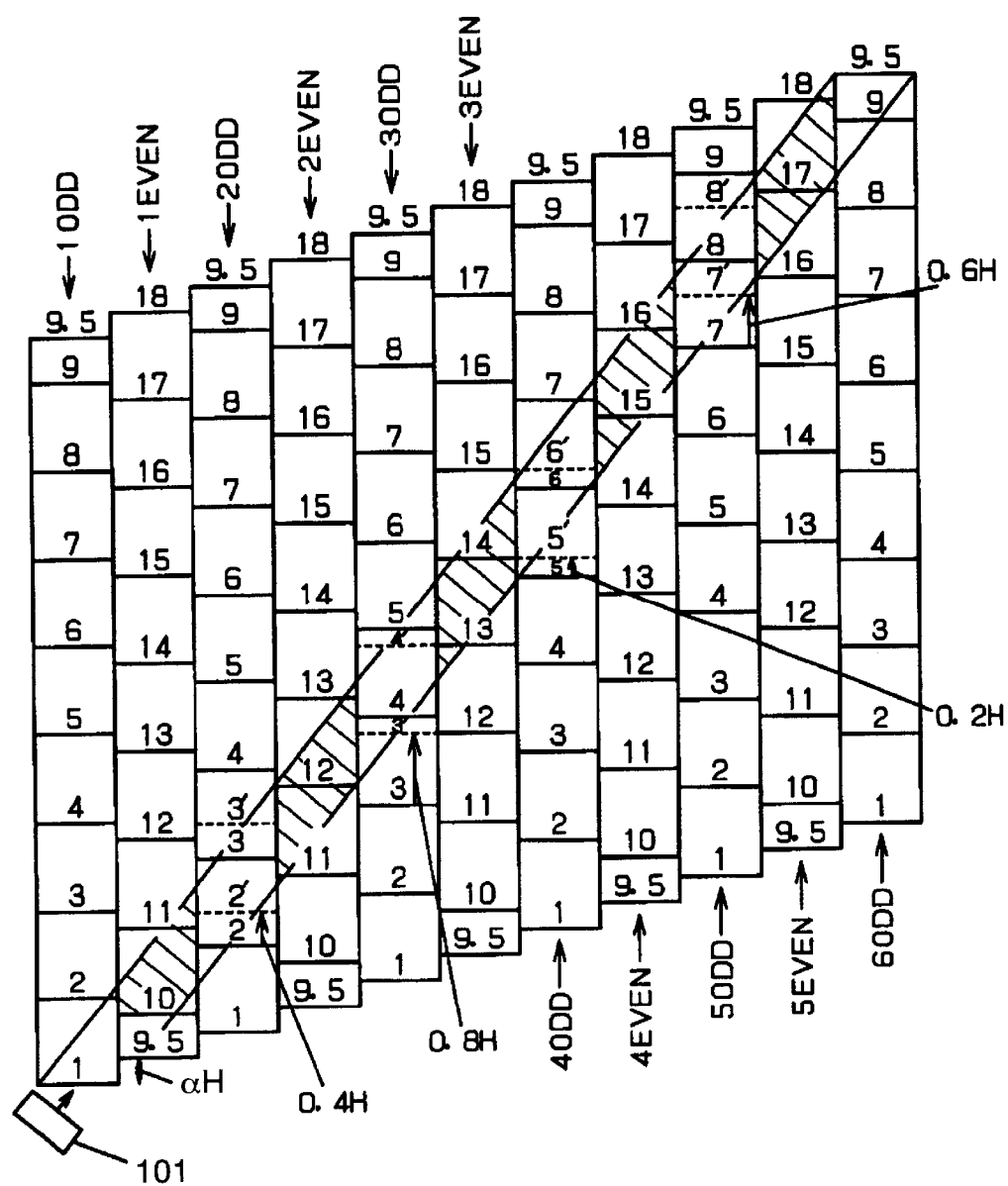
FIG. 2 is a schematic illustration depicting a relation of a scanning path of a magnetic head during an elevenfold fast-forwarding replay with respect to a tape pattern of a quintuplex mode in the first exemplary embodiment of this invention.

FIG. 2 is a schematic illustration depicting a relation of a scanning path of a magnetic head for odd-numbered fields during an elevenfold fast-forwarding replay with respect to a tape pattern recorded in a quintuplex mode in the first exemplary embodiment of this invention. Also, FIG. 3 is another schematic illustration depicting a relation of a scanning path of the magnetic head for odd-numbered fields during an elevenfold fast-rewinding replay with respect to the tape pattern recorded in the quintuplex mode in the first exemplary embodiment of this invention. In FIG. 2 and FIG. 3, hatched areas in the paths show portions where an azimuth angle of the magnetic head does not match with an azimuth angle of the tape tracks. Useful signals are not reproduced in these areas due to azimuth losses. Therefore, they result in horizontal line noises ("noise bars") on a screen. In other words, the magnetic head 101 for odd-numbered fields obtains effective output signals by scanning the tracks 1ODD, 2ODD, 3ODD, 4ODD, 5ODD, and 6ODD in order. In these figures, a track corresponding to the odd-numbered field of a first frame is represented as 1ODD, a track corresponding to an even-numbered field of the first frame as 1EVEN, a track corresponding to another odd-numbered field of a second frame as 2ODD, and so forth in this sequential order.

Displacements of the H-alignment of the tracks 2ODD, 3ODD, 4ODD, and 5ODD with respect to the track 1ODD are 0.4H, 0.8H, 1.2H (or 0.2H), and 1.6H (or 0.6H) respectively. Subsequently, the H aligns again at the track 6ODD. Therefore, a continuity in periodicity of reproduced horizontal synchronizing signals can be maintained by delaying the reproduced signals by 0.4H, 0.8H, 1.2H (or, 0.2H), and 1.6H (or, 0.6H) whenever a noise bar is traversed from the track 1ODD and thereafter. This can be accomplished relatively easily by using a delay element, of which a total delay period is 2H, and adopting a technique of switching successively to delayed signals of 0.4H, 0.8H, 1.2H and 1.6H, an un-delayed reproduced signal, delayed signals of 0.4H, 0.8H, and so forth in increments of 0.4H each time a noise bar is traversed.

The same can be accomplished with a delay element having a total delay period of 1H. That is, reproduction of an image carrying no skew distortion can be realized with a small delay element having only a total delay period of 1H, by switching successively to delayed signals of 0.4H, 0.8H, 0.2H and 0.6H, and the reproduced signal, and so forth.

Figure 3:
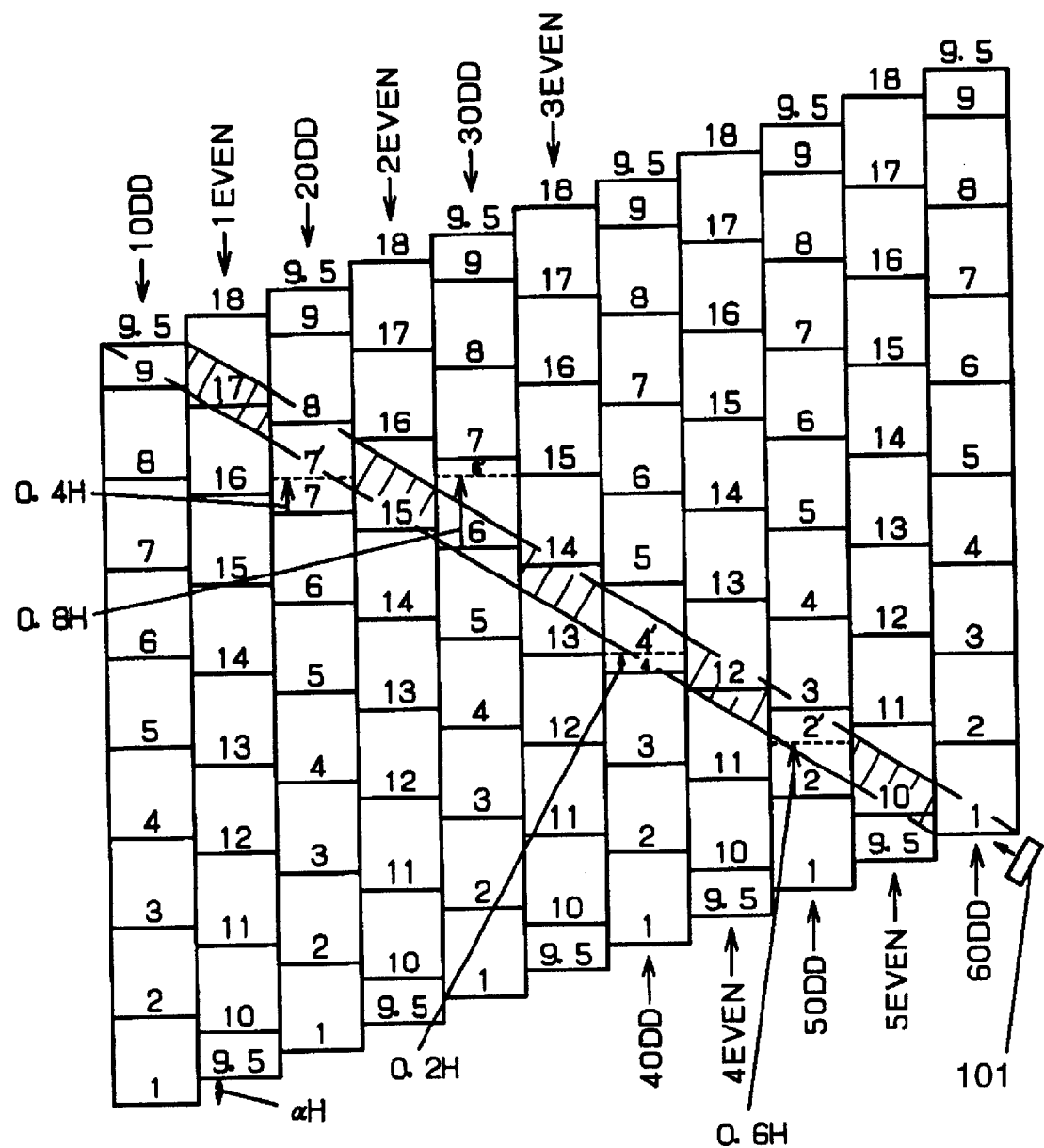
FIG. 3 is a schematic illustration depicting a relation of a scanning path of the magnetic head during an elevenfold fast-rewinding replay with respect to the tape pattern of the quintuplex mode in the first exemplary embodiment of this invention.

Further, in the case of FIG. 3, the continuity in periodicity of reproduced horizontal synchronizing signals can be maintained by delaying the reproduced signals in a reverse order of the elevenfold fast-forwarding replay, that is, an order in delay time of 0.6H (or, 1.6H), 1.2H (or, 0.2H), 0.8H, 0.4H, and 0H, whenever the noise bar is crossed, starting from the track 6ODD. The reason here for selecting the elevenfold fast replay is not only it being a suitable speed for the fast-forwarding replay and the rewinding replay, but also that it can simplify a circuit, since it provides a constant periodicity in such a manner as to start with zero delay time, and finish also with zero delay time for both the odd-numbered fields and the even-numbered fields. A periodicity of this kind exists when a speed of the special replay is ±(n×5+1) times the normal speed, where "n" represents a natural number.

In the case of fast-forward replay with the elevenfold speed as shown in FIG. 2, the switching unit 2 selects a reproduced signal 200a when a signal in the track 1ODD is being reproduced. When the signal being reproduced shifts next to the track 2ODD, a discontinuity of H occurs, thereby resulting in a skew distortion. The skew detection unit 4 detects this skew distortion, and inputs it to the logic unit 3. The switching unit 2 generates a control signal for selecting a 0.4H delay signal 200c, and switches an output of the delay element accordingly. Consequently, this improves the skew distortion caused by a displacement of 0.4H in the H-alignment, when the signal being reproduced shifts from the track 1ODD to the track 2ODD. When the replay magnetic head 101 reproduces the tracks 3ODD, 4ODD, and 5ODD, consecutively thereafter, the switching unit 2 selects a 0.8H-delay output 200e, a 0.2H delay output 200b, and a 0.6H delay output 200d, accordingly in the like manner as above. The skew distortion is thus improved when the videotape recorded in the quintuplex mode is replayed with the elevenfold speed.

Although what has been described above is the case where the delay element 1 is comprised of five delay elements of 0.2H, it may be replaced by one comprised of five delay elements of 0.4H. If this is the case, signals are selected in order of the reproduced signal, delay signals of 0.4H, 0.8H, 1.2H, and 1.6H, and an equivalent effect can be attained as in the case of the 0.2H delay elements.

Furthermore, the skew distortion can be improved also for the elevenfold rewinding replay, by altering the order of selections in the switching unit 2, as is obvious.

According to the first exemplary embodiment as described in the foregoing, images of the special replay with improved skew distortion can be realized from a videotape of the quintuplex mode by providing: the delay unit comprised of the delay element 1 having delay time of 0.2H, 0.4H, 0.6H and 0.8H, or 0.4H, 0.8H, 1.2H and 1.6H; the skew detection unit comprising a skew detector circuit for detecting a portion where H-alignment is out of order, and so on; and the switching unit for switching an output of the delay unit according to an output of the skew detection unit or a head switching signal.

(Second Exemplary Embodiment)

Figure 4:
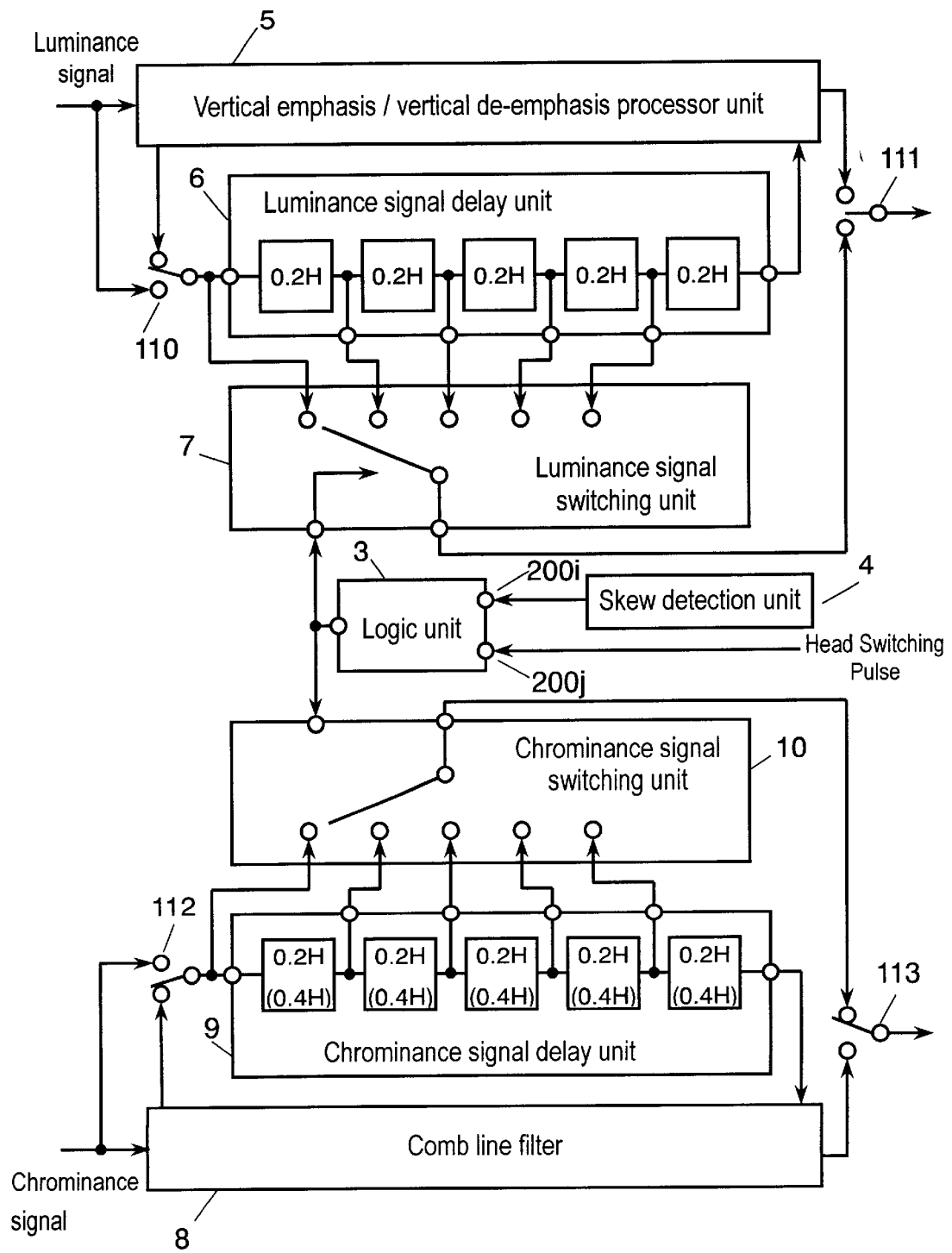
FIG. 4 is a block diagram depicting a structure of an essential portion of a video cassette recorder of a second exemplary embodiment of this invention.

FIG. 4 is a block diagram depicting a structure of an essential portion of a video cassette recorder of a second exemplary embodiment of this invention. As shown in FIG. 4, it comprises: a vertical emphasis/vertical de-emphasis processor unit 5 for a luminance signal; a luminance signal delay unit 6 having a delay time of 1H used for vertical emphasis and vertical de-emphasis; a luminance signal switching unit 7 for switching an output from the luminance signal delay unit; a comb line filter 8 for suppressing crosstalk between chrominance signals on adjoining tracks; a chrominance signal delay unit 9 having delay time of 1H or 2H used for the comb line filter; a chrominance signal switching unit 10 for switching an output from the chrominance signal delay unit 9; a skew detection unit 4 for detecting a skew; and a logic unit 3 for controlling the switching units 10 and 7 with an output of the skew detection unit 4 and a head switching pulse. The processor unit 5 is employed in a recording and reproduction circuit block for the triplex mode. Its function is to improve an S/N ratio of the luminance signal by emphasizing it in a vertical direction as viewed on a screen, so as to distribute deterioration in images that converge on edges in some of the images.

The luminance signal delay unit 6 functions as a delay element for vertical emphasis and vertical de-emphasis in the triplex mode. Further, the chrominance signal delay unit 9 functions as a delay element for the comb line filter in the standard mode and the triplex mode.

In the special replay of quintuplex mode, an input switch 110 for the luminance signal delay unit 6 switches from a vertical de-emphasis side to a luminance signal input side. An output switch 111 for the vertical emphasis/vertical de-emphasis processor unit 5 also switches from the vertical de-emphasis side to a luminance signal switching unit 7 side. In the chrominance signal section of the circuit, an input switch 112 for the chrominance signal delay unit 9 switches from a comb line filter side to a chrominance signal input side, and a comb line filter output switch 113 switches from a comb line filter output side to a chrominance signal switching unit 10 side, in the same manner.

The skew detection unit 4 detects a skew distortion at every change from one track to another, and inputs a detection signal to the logic unit 3, in the same manner as the first exemplary embodiment. The logic unit 3 outputs to the luminance signal switching unit 7 and the chrominance signal switching unit 10, a switching control signal corresponding to the track being reproduced. Accordingly, this can improve the skew distortion in the special replay of quintuplex mode, caused by a displacement in H-alignment, which occurs in the reproduced signal at every change of the track.

As has been described, the 1H delay element for use in the vertical emphasis/vertical de-emphasis is also used for skew correction of the luminance signal. In addition, the delay element of 1H or 2H used for the comb line filter is also used for skew correction of the chrominance signal. This can therefore realize an improvement of the skew distortion in the special replay of quintuplex mode with low cost.

In the foregoing description, although the skew detection unit 4 is used for detecting a portion where H-alignment is not in order, the skew detection unit 4 may be used instead as a dropout detector for detecting a dropout in which an effective signal is not reproduced for longer than a certain period of time. During the special replay, a magnetic head must cross the adjoining track (one of the EVEN tracks in the case of FIG. 2) when it changes a reproducing track, and a dropout (i.e. noise bar) occurs, since it does not gain a reproduced signal in this adjoining track due to an azimuth loss. In this case, detection of this dropout can thus yield a signal equivalent to the one obtained in the skew detection.

(Third Exemplary Embodiment)

Figure 5:
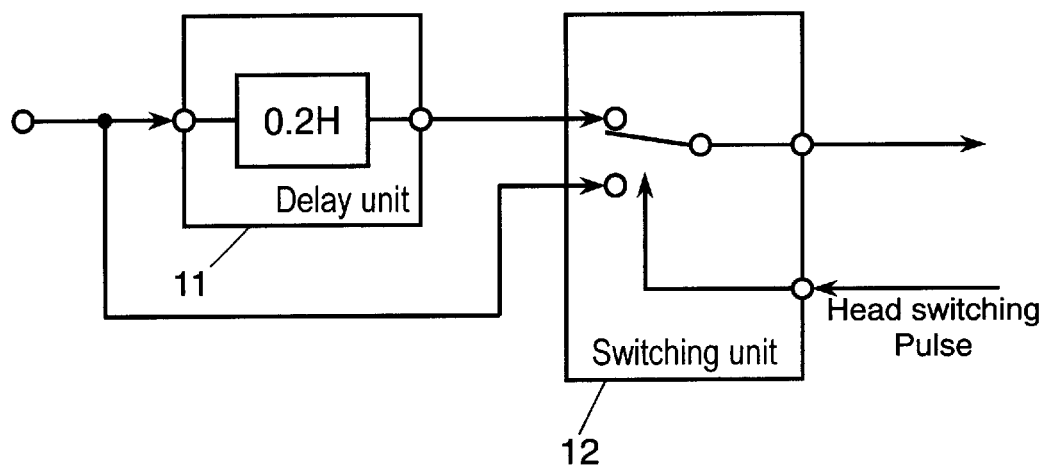
FIG. 5 is a block diagram depicting a structure of a video cassette recorder of a third exemplary embodiment of this invention.

FIG. 5 is a block diagram depicting a structure of an essential portion of a VCR of a third exemplary embodiment of this invention. As shown in FIG. 5, it comprises a delay unit 11 consisting of a 0.2H delay element, and a switching unit 12 for switching between a reproduced signal and another signal delayed by the delay unit 11.

Figure 6:
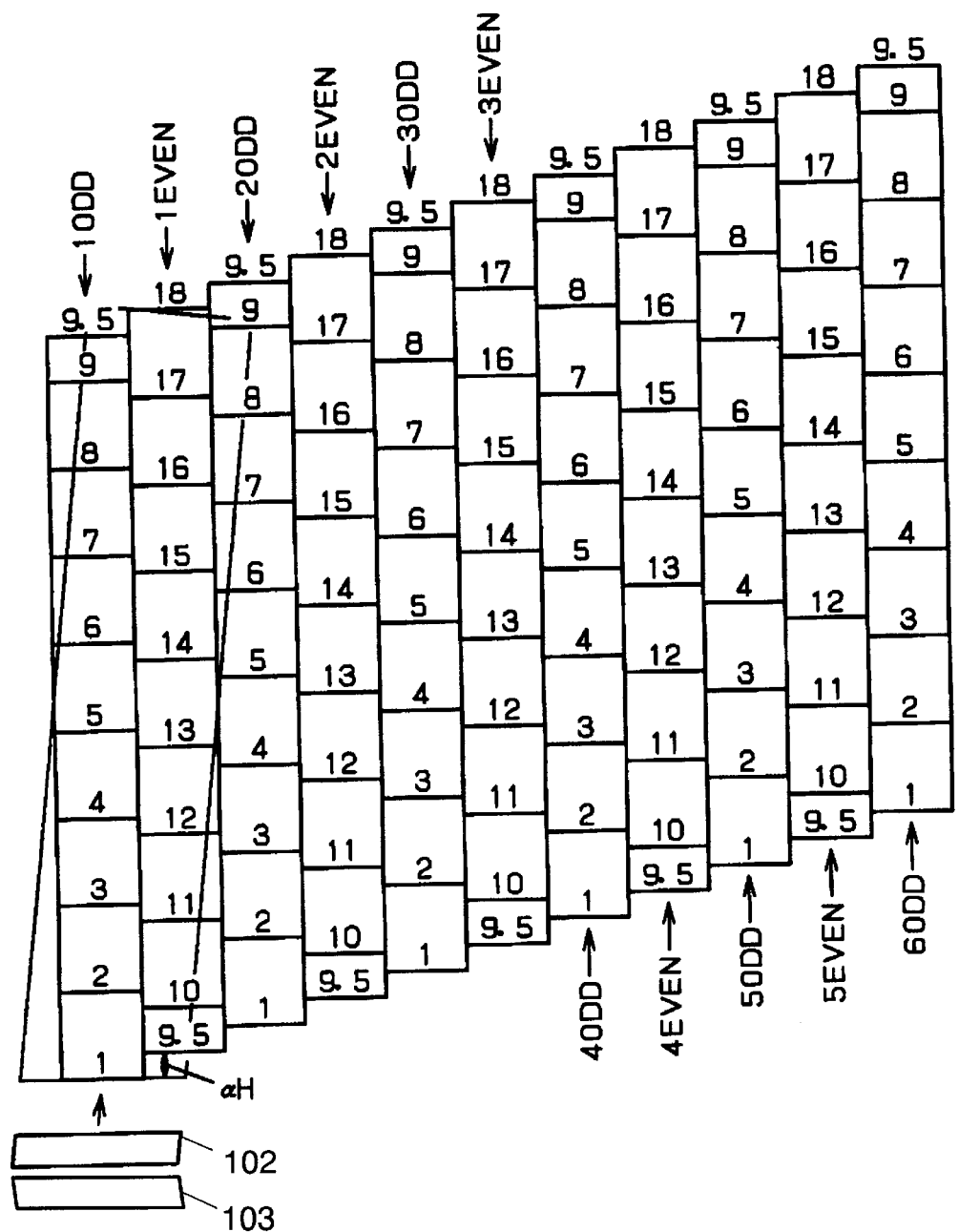
FIG. 6 is a schematic illustration depicting a relation of a scanning path of a pair of magnetic heads with respect to the tape pattern of the quintuplex mode, when a still image is reproduced with the pair of magnetic heads having a width larger than a pitch of recorded tracks, in the third exemplary embodiment of this invention.
Figure 7:
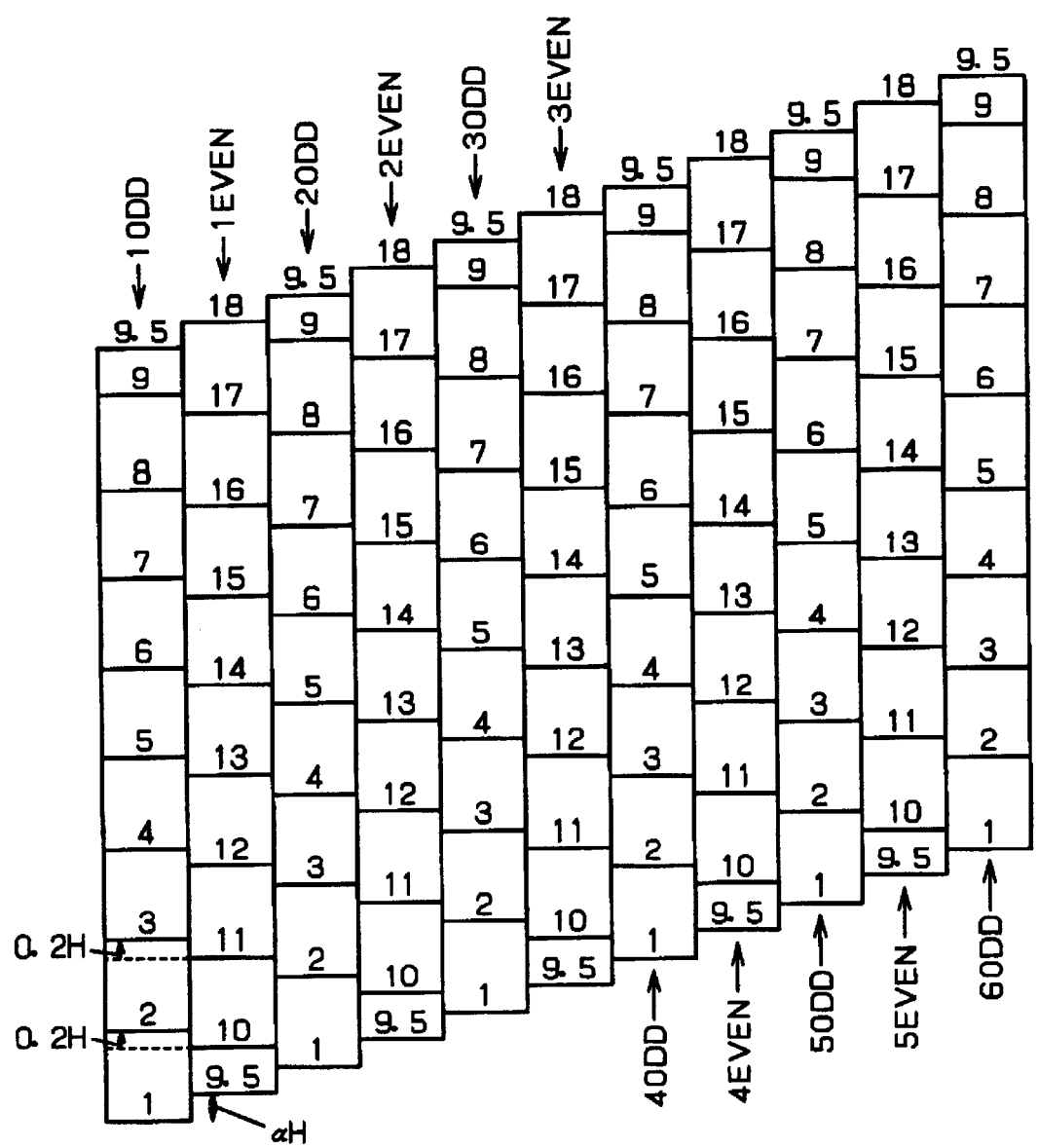
FIG. 7 is a schematic illustration depicting the tape pattern recorded in the quintuplex mode.

FIG. 6 is a schematic illustration depicting a relation of a scanning path of a pair of magnetic heads having a width twice as large as a pitch of recorded tracks with respect to a tape pattern of the quintuplex mode, when a still frame image is reproduced with the pair of magnetic heads, i.e. a head 102 for even-numbered fields and a head 103 for odd-numbered fields, in the third exemplary embodiment of this invention. It is suitable to render magnetic heads used for recording and reproduction in the triplex mode to also serve as these heads 102 and 103. A track width in the standard specifications for the quintuplex mode is 11.6 ìm, and that of the triplex mode is 19.6 ìm. As a width of the magnetic heads for use in the triplex mode, a dimension of approx. twice the width of the tracks recorded in the quintuplex mode is chosen.

The two magnetic heads 102 and 103 for odd-numbered fields and even-numbered fields, provided with a different azimuth angle with respect to each other, scan over the same track, because the tape feed is halted. Due to a relation of azimuth angles between the magnetic heads and the track pattern, the magnetic head 103 for odd-numbered fields reproduces only a signal of the track 1ODD, and the magnetic head 102 for even-numbered fields reproduces only a signal of the track 1EVEN.

Since there exists a displacement of 0.2H in H-alignment, as described in the first exemplary embodiment, a skew distortion occurs due to a failure in continuity of H in the vicinity of a vertical signal, unless the signal from the track 1EVEN is delayed by 0.2H. A still image with improved skew distortion can be thus obtained, by delaying the signal of the track 1EVEN by 0.2H, and outputting it in place of the signals of the track 1ODD, which is not delayed.

Described hereinafter pertains to a concrete case, when a videotape recorded in the quintuplex mode is replayed for a still image. The switching unit 12 selects the reproduced signal when the head 103 for odd-numbered fields is in operation for reproduction. The switching unit 12 selects a signal, which is the reproduced signal delayed by the delay unit 11, when the head 102 for even-numbered fields operates for reproduction. Switching control of the switching unit 12 is implemented by a head switching pulse which is the head switching signal. Accordingly, the skew distortion due to a displacement of 0.2H in the H-alignment can be improved.

A similar effect can be achieved, by delaying the signal reproduced with the magnetic head for odd-numbered fields by 0.2H, and outputting it in place the signal reproduced with the magnetic head for even-numbered fields by means of a head switching pulse.

As described above, the skew distortion, which occurs when a still image is reproduced from a signal recorded in the quintuplex mode, can be improved by providing the delay unit 11 comprised of the 0.2H delay element and the switching unit 12, and using the pair of heads wider than the pitch of recorded tracks, thereby achieving reproduction of an excellent still image.

As described in the foregoing, the present invention can improve a skew distortion without using an expensive TBC circuit that had been required in the past, in the special replay (e.g. fast-forward replay and fast-rewinding replay) of the quintuplex mode, in which H-alignment is not in proper order with the adjoining tracks.

Furthermore, the delay unit shares a function of the delay element of 1H, which is used for the vertical emphasis and vertical de-emphasis performed during recording and reproduction in the triplex mode, for delaying the luminance signal. The other delay unit is also constructed so that it shares the delay element of 1H or 2H, which serves for the comb line filter used to suppress crosstalk between chrominance signals on the adjoining tracks, for delaying the chrominance signal. Therefore, the excellent special replay images can be achieved by correcting the skew distortion liable to occur in the special replay of a signal recorded in the quintuplex mode, without providing additional delay elements and therefor only with an added cost of minimal amount.

Moreover, in the VCR, which uses a pair of heads having a width wider than a pitch of the recorded tracks for recording or reproducing in the quintuplex mode, and uses the pair of heads for reproducing a still image of signal recorded in the quintuplex mode, a still frame image with an improved skew distortion can be realized by providing the delay unit for delaying by 0.2H an output reproduced with one of the pair of heads, and the switching unit for switching between a un-delayed original signal output by the head and an output of the delay unit.

What is claimed is:

1. A video cassette recorder for performing a special replay of a signal recorded in a mode providing quintuple the recording time of a standard recording mode, said video cassette recorder comprising:

a delay unit for delaying a reproduced signal by any of 0.2H, 0.4H, 0.6H, 0.8H, and 1H;

a skew detection unit; and a switching unit for selecting any of said reproduced signal and an output of said delay unit in response to any of a signal detected by said skew detection unit and a magnetic head switching signal.

2. A video cassette recorder for performing a special replay of a signal recorded in a mode providing quintuple the recording time of a standard recording mode, said video cassette recorder comprising:

a delay unit for delaying a reproduced signal by any of 0.4H, 0.8H, 1.2H, 1.6H, and 2H;

a skew detection unit; and a switching unit for selecting any of said reproduced signal and an output of said delay unit in response to any of a signal detected by said skew detection unit and a magnetic head switching signal.

3. The video cassette recorder as set forth in claim 2 further having a function for a mode having triple the recording time of the standard recording mode, wherein said delay unit shares a delay element of 1H used for vertical emphasis and vertical de-emphasis performed during recording and reproduction in said triplex recording mode.

4. The video cassette recorder as set forth in claim 1, wherein said delay unit shares a delay element of 1H or 2H for a comb line filter used for suppressing crosstalk between chrominance signals on the adjoining tracks.

5. A video cassette recorder for reproducing a still image of a signal recorded in a mode providing quintuple the recording time of a standard recording mode, said video cassette recorder comprising:

a pair of magnetic heads for recording and reproduction having a width wider than a pitch of recorded tracks;

a delay unit for delaying by 0.2H a signal reproduced by one of said pair of magnetic heads for recording and reproduction; and a switching unit for selecting any of a signal reproduced by the other of said pair of magnetic heads and an output signal of said delay unit in response to a head switching signal.

6. The video cassette recorder as set forth in claim 2, wherein said delay unit shares a delay element of 1H or 2H for a comb line filter used for suppressing crosstalk between chrominance signals on the adjoining tracks.

7. The video cassette recorder as set forth in claim 3, wherein said delay unit shares a delay element of 1H or 2H for a comb line filter used for suppressing crosstalk between chrominance signals on the adjoining tracks.

* * * * *